(12) United States Patent
Sharma et al.

(10) Patent No.: US 11,851,844 B2
(45) Date of Patent: Dec. 26, 2023

(54) IMPLEMENT TRAVEL PREDICTION FOR A WORK MACHINE (71) Applicant: Caterpillar Inc., Peoria, IL (US)

(72) Inventors: Amit Sharma, Dunlap, IL (US);
Raghavendra Boloor, Peoria, IL (US);
Steven C Budde, Dunlap, IL (US);
Jeremy J. Diaz, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1011 days.

(21) Appl. No.: 16/748,737

(22) Filed: Jan. 21, 2020

(65) Prior Publication Data

US 2021/0222397 A1 Jul. 22, 2021

(51) Int. Cl.
*E02F 9/20* (2006.01)
*E02F 3/84* (2006.01)
(Continued)

(52) U.S. Cl.
CPC ............ *E02F 3/844* (2013.01); *E02F 9/2033* (2013.01); *E02F 9/265* (2013.01); *E02F 3/7609* (2013.01)

(58) Field of Classification Search
CPC ......... E02F 9/2214; E02F 3/422; E02F 3/431; E02F 9/2271; E02F 9/2228; E02F 9/2267; E02F 3/283; E02F 3/3417; E02F 9/2004; E02F 9/20; E02F 9/265; E02F 3/7609; E02F 3/7613; E02F 3/7618; E02F 3/84; E02F 3/76; E02F 9/22; E02F 3/844; E02F 9/2033; F15B 13/042; F15B 11/04; F15B 19/002; F15B 2211/327; F15B 2211/41572; F15B 2211/6303; F15B 11/0406; F15B 2211/351; F15B 2211/6336;
(Continued)

(56) References Cited

U.S. PATENT DOCUMENTS 4,745,551 A * 5/1988 Wand ...................... G05D 1/028
701/23
8,738,242 B2 * 5/2014 Konno ...................... E02F 3/845
172/58
(Continued)

FOREIGN PATENT DOCUMENTS

EP 0623753 A1 11/1994
JP 2019052499 A 4/2019
(Continued)

*Primary Examiner* — Edwin J Toledo-Duran
(74) *Attorney, Agent, or Firm* — Harrity & Harrity, LLP (57) ABSTRACT

A controller may identify a command to move an implement in a particular direction and an amount of time for the implement to move in the particular direction. The controller may determine an estimated velocity of the implement moving in the particular direction. The controller may determine a predicted travel distance of the implement in the particular direction. The controller may cause, based on a stop position associated with the particular direction and the predicted travel distance of the implement in the particular direction, the implement to move from a current position to a reset position. The controller may cause the command to be executed to cause the implement to move, in the particular direction and for the amount of time, from the reset position to another position without hitting the stop position associated with the particular direction.

20 Claims, 5 Drawing Sheets

(51) Int. Cl.
*E02F 9/26* (2006.01)
*E02F 3/76* (2006.01)

(58) Field of Classification Search
CPC ...... F15B 2211/755; F15B 2211/50563; F15B 2211/8606; F15B 2211/6654; F15B 2211/853; F15B 21/082; F15B 2211/6346; F15B 21/087; F15B 2211/6313; F15B 2211/715; F15B 11/02; G05B 19/02; G05B 11/01; G05B 13/02; G05D 2201/0201; G05D 1/0223
See application file for complete search history.

(56) References Cited

U.S. PATENT DOCUMENTS

| | | | | |
|---|---|---|---|---|
| 8,915,308 | B2* | 12/2014 | Joergensen | E02F 9/265 |
| | | | | 701/50 |
| 10,030,358 | B2* | 7/2018 | Wallace | E02F 9/261 |
| 11,346,086 | B1* | 5/2022 | Kikani | E02F 9/2041 |
| 2007/0078573 | A1* | 4/2007 | Ivansson | G05D 1/0223 |
| | | | | 701/14 |
| 2008/0009964 | A1* | 1/2008 | Bruemmer | G05D 1/0223 |
| | | | | 700/245 |
| 2008/0009970 | A1* | 1/2008 | Bruemmer | G05D 1/0088 |
| | | | | 700/245 |
| 2008/0313935 | A1* | 12/2008 | Trifunovic | E02F 9/2004 |
| | | | | 37/413 |
| 2009/0295601 | A1* | 12/2009 | Villaume | G05D 1/0223 |
| | | | | 340/961 |
| 2014/0107971 | A1* | 4/2014 | Engedal | B66D 1/52 |
| | | | | 702/150 |
| 2014/0121840 | A1* | 5/2014 | Mizuochi | G06F 30/15 |
| | | | | 700/275 |
| 2015/0362922 | A1* | 12/2015 | Dollinger | G05D 1/0291 |
| | | | | 701/2 |
| 2017/0060137 | A1* | 3/2017 | Shitamoto | G05D 1/0088 |
| 2017/0327118 | A1* | 11/2017 | Masui | G05D 1/0246 |
| 2017/0364084 | A1* | 12/2017 | Sakima | G07C 5/00 |
| 2018/0251126 | A1* | 9/2018 | Linscott | G05D 1/0274 |
| 2018/0364739 | A1* | 12/2018 | Foster | G05D 1/0219 |
| 2019/0100899 | A1* | 4/2019 | Kimura | E02F 9/22 |
| 2019/0126919 | A1* | 5/2019 | Sundar Pal | G05D 1/0088 |
| 2019/0264420 | A1* | 8/2019 | Henn | E02F 9/2214 |
| 2020/0131737 | A1* | 4/2020 | Suzuki | E02F 3/435 |
| 2020/0224384 | A1* | 7/2020 | Suzuki | E02F 3/435 |
| 2021/0002852 | A1* | 1/2021 | Nishi | E02F 9/262 |
| 2021/0047808 | A1* | 2/2021 | Yamada | E02F 9/268 |
| 2021/0149403 | A1* | 5/2021 | Ready-Campbell | |
| | | | | G05D 1/0027 |
| 2021/0230837 | A1* | 7/2021 | Narikawa | E02F 9/2228 |
| 2021/0270013 | A1* | 9/2021 | Nishi | E02F 9/264 |
| 2022/0010519 | A1* | 1/2022 | Izumikawa | E02F 3/437 |

FOREIGN PATENT DOCUMENTS

| | | |
|---|---|---|
| WO | 2010054155 A2 | 5/2010 |
| WO | 2017213572 A1 | 12/2017 |

* cited by examiner

IMPLEMENT TRAVEL PREDICTION FOR A WORK MACHINE

TECHNICAL FIELD

The present disclosure relates generally to calibrating an implement of a work machine and to predicting implement travel to facilitate calibration of the implement.

BACKGROUND

Various types of machines used, for example, in the construction industry, include implements, such as a blade, a bucket, and/or the like to perform one or more operations. An operator of the machine may interact with operator controls of the machine to cause the implement to move in a particular direction (e.g., up, down, to the right, to the left). However, the operator may cause the implement to move too far in the particular direction and cause the implement to hit a stop position (e.g., a position associated with a full extension of the implement). This may cause the implement to suddenly stop and/or may damage the implement. Further, the implement hitting the stop position may cause the implement and/or the machine to vibrate, which may impact a performance of the implement and/or the machine.

One attempt to prevent an implement from hitting a stop position is disclosed in Japanese Patent Application Publication No. JP2019052499 published on Apr. 4, 2010 ("the '499 publication"). In particular, the '499 publication discloses decelerating a cylinder of an implement of a work machine when the cylinder approaches a stroke end of the cylinder to prevent the cylinder from hitting the stroke end. While the '499 publication may be effective to reduce a speed of the cylinder of the implement to prevent the cylinder of the implement from hitting a stroke end, the '499 publication does not disclose any way to prevent the cylinder from hitting the stroke end without reducing the cylinder's speed. The system of the present disclosure solves one or more of the problems set forth above and/or other problems in the art.

SUMMARY

According to some implementations, a method may include identifying a command to move an implement of a work machine in a particular direction and an amount of time for the implement to move in the particular direction; determining, based on a previously determined velocity of the implement moving in the particular direction, an estimated velocity of the implement moving in the particular direction; determining, based on the amount of time and the estimated velocity, a predicted travel distance of the implement in the particular direction; causing, based on a stop position associated with the particular direction and the predicted travel distance of the implement in the particular direction, the implement to move from a current position to a reset position; and causing the command to be executed to cause the implement to move, in the particular direction and for the amount of time, from the reset position to another position without hitting the stop position associated with the particular direction.

According to some implementations, a controller may include one or more memories; and one or more processors, communicatively coupled to the one or more memories, configured to: identify a command to move an implement of a work machine in a particular direction and an amount of time to move the implement in the particular direction; determine, based on previously moving the implement in the particular direction, an estimated velocity of the implement moving in the particular direction; determine, based on the amount of time and the estimated velocity, a predicted travel distance of the implement in the particular direction; cause, based on the predicted travel distance of the implement in the particular direction, the implement to move from a current position to a reset position; and cause the command to be executed to cause the implement to move, in the particular direction and for the amount of time, from the reset position to another position without hitting a stop position associated with the particular direction.

According to some implementations, an implement calibration system may comprise an implement associated with a work machine and configured to move in a first direction and a second direction, wherein the first direction is opposite of the second direction; an implement control device configured to control the implement; and a controller configured to: obtain, from the implement control device, a command to move the implement in the first direction; determine, based on a power level of the command and a calibration map associated with the implement, an estimated velocity of the implement moving in the first direction; determine, based on an amount of time to move the implement in the first direction and the estimated velocity, a predicted travel distance of the implement in the first direction; cause, based on the predicted travel distance of the implement in the first direction, the implement to move in the second direction from a current position to a reset position; cause the command to be executed to cause the implement to move, in the first direction and for the amount of time, from the reset position to another position without hitting a stop position associated with the first direction; determine, based on causing the command to be executed, a maximum velocity of the implement when moving in the first direction from the reset position to the other position; and cause the calibration map associated with the implement to be updated to indicate an association between the power level of the command and the determined maximum velocity of the implement.

DETAILED DESCRIPTION

Figure 1:
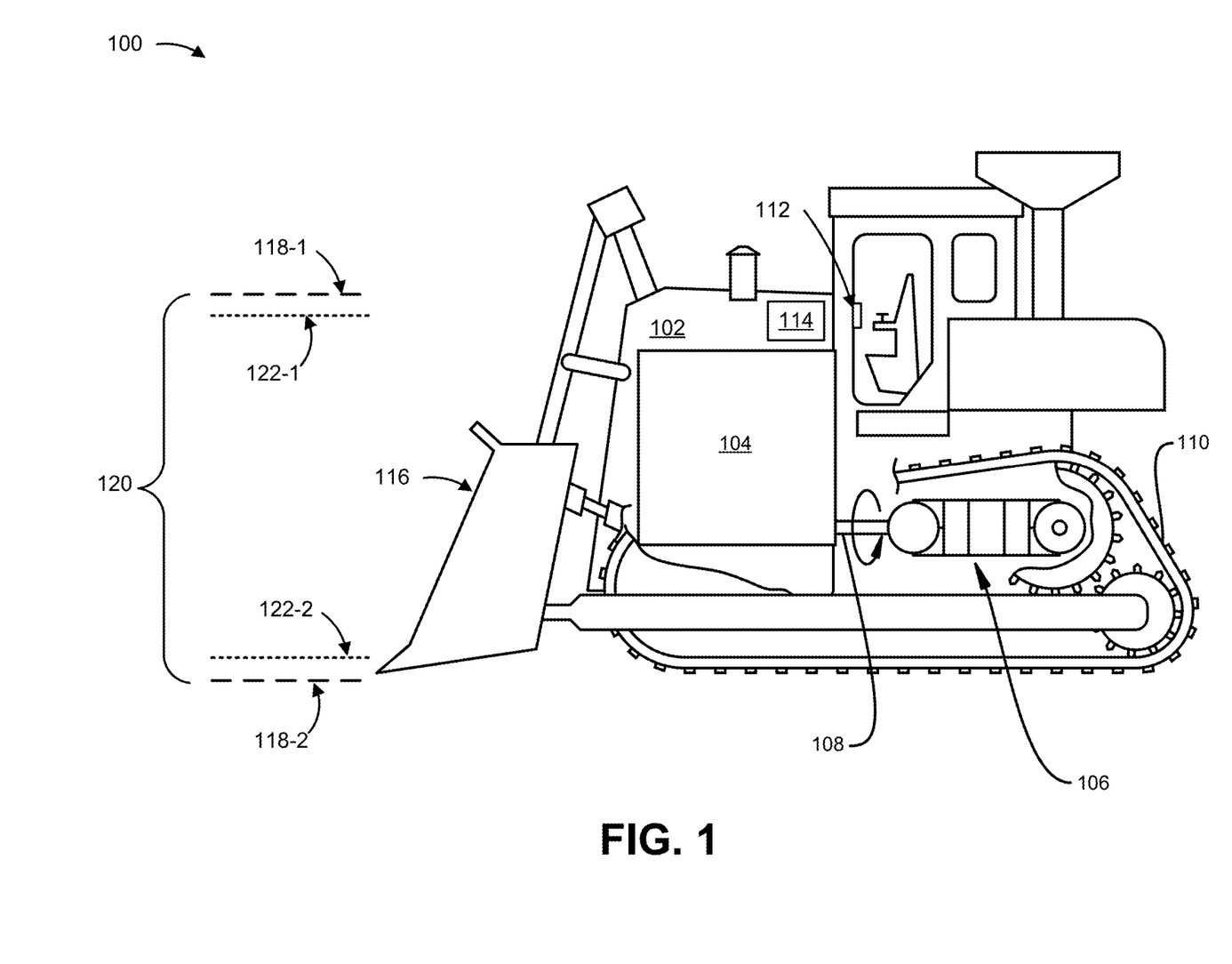
FIG. 1 is a diagram of an example machine described herein.

FIG. 1 is a diagram of an example machine 100 described herein. The term "machine" or "work machine" may refer to any machine that performs an operation associated with an industry such as, for example, mining, construction, farming, transportation, or any other industry. For example, the machine 100 may include a mobile machine, such as a track type tractor shown in FIG. 1, or any other type of mobile machine.

As shown in FIG. 1, the machine 100 includes a frame 102 that supports an engine 104, a drive system 106, a drive shaft 108, and a traction system 110. The machine 100 further includes operator controls 112 that interact with a control device 114 to control an implement 116.

The engine 104 is configured to supply power to the machine 100. The engine 104 may be an internal combustion engine (for example, a compression ignition engine), but in general, the engine 104 may be any prime mover that provides power to various systems of the machine 100. The engine 104 may be fueled by such fuels as distillate diesel fuel, biodiesel, dimethyl ether, gaseous fuels (such as hydrogen, natural gas, and propane), alcohol, ethanol, and/or any combination thereof.

The engine 104 is configured to provide operating power for operation of the implement 116 via, for example, the drive system 106, the drive shaft 108, and/or the like. The engine 104 is operably arranged to receive control information from the control device 114. Additionally, the engine 104 is operably arranged with the implement 116 to operate the implement 116 according to the control information received from the control device 114.

The drive system 106 is movably connected to the engine 104 via the drive shaft 108 to operate the implement 116 and to propel the machine 100 (e.g., via the traction system 110). The traction system 110 includes a track-drive system, a wheel-drive system, or any other type of drive system configured to propel the machine 100.

Figure 2:
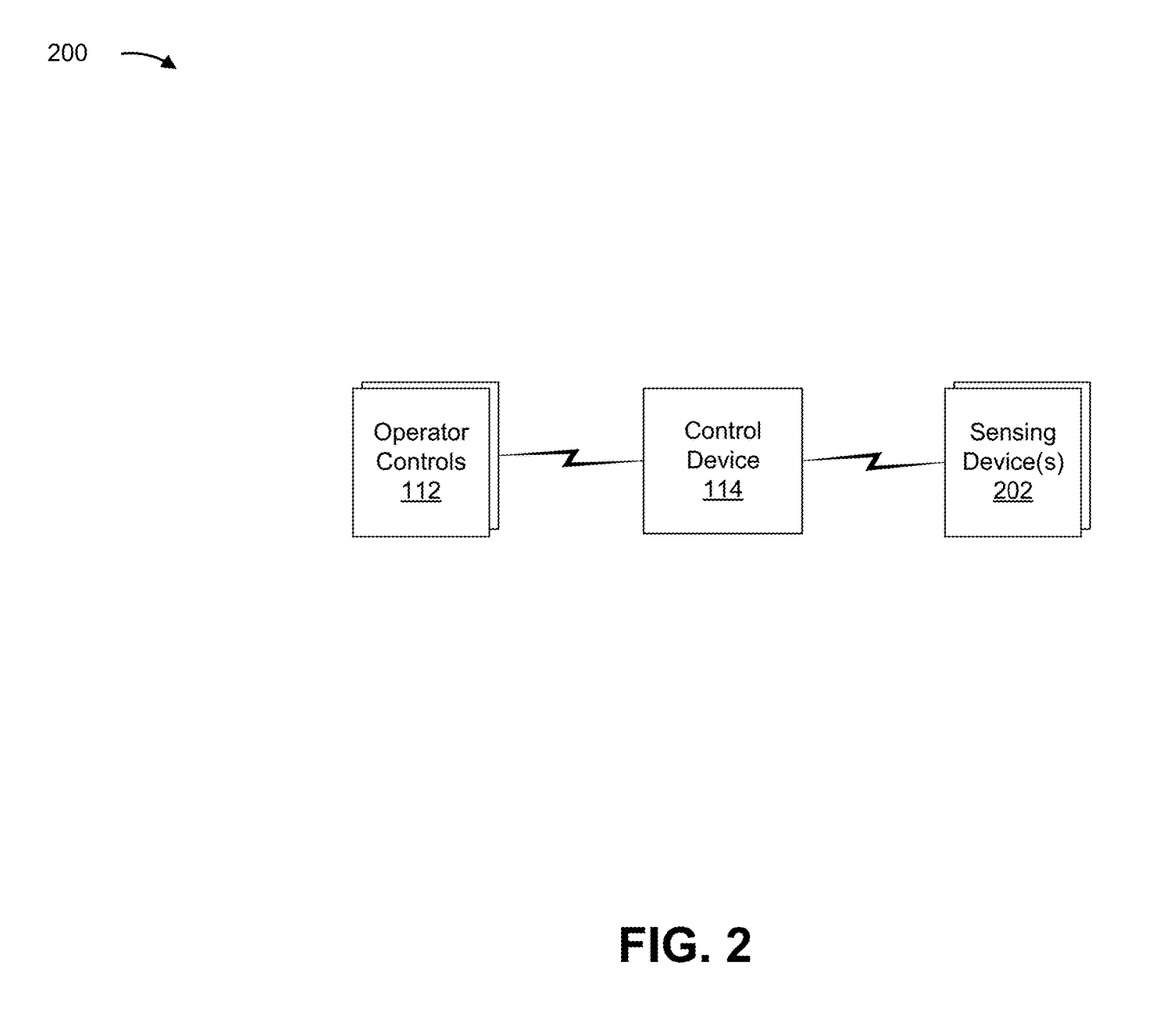
FIG. 2 is a diagram of an example environment described herein.

The operator controls 112 are operably connected to the control device 114 and are configured to generate one or more commands to move the implement 116, as further described herein in relation to FIG. 2. The control device 114 is configured to generate control information to control movement of the implement 116, as further described herein in relation to FIG. 2.

The implement 116 is operably arranged with the engine 104 such that the implement 116 is movable through control information transmitted from the control device 114 to the engine 104. The illustrated implement 116 is a blade that can move up and down, left and right, and/or the like. Other embodiments can include any other suitable implement for performing a variety of tasks, including, for example, ripping, dozing, brushing, compacting, grading, lifting, loading, plowing, and/or the like. Example implements 116 include rippers, augers, buckets, breakers/hammers, brushes, compactors, cutters, forked lifting devices, grader bits and end bits, grapples, and/or the like.

The implement 116 is associated with one or more stop positions 118 (e.g., shown in FIG. 1 as stop position 118-1 and stop position 118-2). A stop position may be a position associated with a full extension of the implement 116 in a particular direction. For example, as shown in FIG. 1, the stop position 118-1 is a position associated with a full extension of the implement 116 in an upward direction and the stop position 118-2 is a position associated with a full extension of the implement 116 in a downward direction. Accordingly, the implement 116 has a full range of motion 120 (e.g., a distance between stop positions 118-1 and 118-2).

Additionally, or alternatively, the implement 116 may be associated with one or more soft stop positions 122 (e.g., shown in FIG. 1 as soft stop position 122-1 and soft stop position 122-2). A soft stop position may be a position associated with a less than full extension of the implement 116 in a particular direction (e.g., a maximum allowed position in the particular direction to avoid the implement 116 hitting a stop position in the particular direction). A soft stop position associated with a particular direction may be a particular distance (e.g., in millimeters, centimeters, meters, and/or the like) away from a stop position associated with the particular direction (e.g., in an opposite direction of the particular direction). For example, the soft stop position 122-1 associated with the upward direction is a particular distance away (e.g., in a downward direction) from the stop position 118-1 associated with the upward direction. As another example, the soft stop position 122-2 associated with the downward direction is the particular distance away (e.g., in an upward direction) from the stop position 118-2 associated with the downward direction. The particular distance may be based on the full range of motion 120 of the implement 116. For example, the particular distance may be a percentage of the full range of motion 120 of the implement 116 (e.g., 5%, 10%, 12%, and/or the like of the full range of motion 120 of the implement 116).

As indicated above, FIG. 1 is provided as an example. Other examples are possible and may differ from what was described in connection with FIG. 1.

FIG. 2 is a diagram of an example environment 200 in which systems and/or methods described herein may be implemented. As shown in FIG. 2, environment 200 includes the operator controls 112, the control device 114, one or more sensing devices 202, and/or the like. Devices of environment 200 may interconnect via wired connections, wireless connections, or a combination of wired and wireless connections.

The operator controls 112 may include one or more implement control devices, such as a dial, a knob, a slider, a joystick, and/or the like to control movement of the implement 116. The operator controls 112 are configured to generate one or more commands to move the implement 116 and send (e.g., directly or via one or more other components or devices of the machine 100, such as a different control device) the one or more commands to the control device 114 (e.g., on a scheduled basis, on a triggered basis, on an on-demand basis, and/or the like).

The control device 114 may be a controller, an electronic control unit (ECU), and/or the like of the machine 100. The control device 114 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. The processor may be implemented in hardware, firmware, and/or a combination of hardware and software. The control device 114 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the control device 114. The control device 114 may include a memory (e.g., a non-transitory computer-readable medium) capable of storing instructions that, when executed, cause the processor to perform one or more processes and/or methods described herein. The control device 114 is configured to control movement of the implement 116.

The one or more sensing devices 202 (referred to singularly as "sensing device 202" and collectively as "sensing devices 202") include any type of sensor configured to measure a position of the implement 116. For example, the sensing devices 202 may include a global positioning system (GPS) device, a local positioning system (LPS) device, an inertial measurement unit (IMU) device, and/or the like to detect a position of the implement 116. The sensing devices 202 are configured to send (e.g., directly or via one or more other components or devices of the machine 100, such as a different control device) position information concerning the implement 116 to the control device 114 (e.g., on a scheduled basis, on a triggered basis, on an on-demand basis, and/or the like).

In a first scenario, such as a scenario to initiate calibration of the implement 116, an operator of the operator controls 112 interacts with (e.g., moves, slides, rolls, pushes, and/or the like) the one or more implement control devices of the operator controls 112. For example, the operator may interact with the one or more implement control devices of the operator controls 112 to generate a command to move (e.g., to change a position of) the implement 116. Additionally, or alternatively, the control device 114 may generate (e.g., automatically generate, based on an algorithm) the command.

The command may indicate a particular direction in which to move the implement 116, a power level (e.g., an amount of power (e.g., in terms of a percentage of maximum power) that the engine 104 is to supply to the drive system 106 and/or the drive shaft 108 to move the implement 116 in the particular direction), and/or the like. For example, the operator may interact with the one or more implement control devices to generate a command to move the implement 116 (e.g., up, down, right, left, and/or the like), at a maximum power level (e.g., a 100% power level that indicates 100% power of the engine).

In some implementations, the operator controls 112 may send (e.g., when the operator controls 112 generate the command) the command to the control device 114. The control device 114 may process (e.g., parse) the command to identify and/or determine the particular direction, the power level, and/or the like indicated by the command.

The control device 114 may cause the command to be executed to cause the implement 116 to move in the particular direction until the implement 116 hits a stop position associated with the particular direction. For example, the control device 114 may send control information to the engine 104 to cause the engine 104 to supply an amount of power indicated by the power level to the drive system 106 and/or the drive shaft 108 to move the implement 116 in the particular direction from a starting position to the stop position associated with the particular direction.

After causing the command to be executed, the control device 114 may determine and/or identify the stop position associated with the particular direction. For example, when the particular direction is upward, the control device 114 may determine and/or identify the stop position 118-1 (e.g., as shown in FIG. 1). As another example, when the particular direction is downward, the control device 114 may determine and/or identify the stop position 118-2 (e.g., as shown in FIG. 1).

Similarly, the control device 114 may determine and/or identify a soft position associated with the particular direction. For example, when the particular direction is upward, the control device 114 may determine and/or identify the soft stop position 122-1 (e.g., as shown in FIG. 1). As another example, when the particular direction is downward, the control device 114 may determine and/or identify the soft stop position 122-2 (e.g., as shown in FIG. 1). In some implementations, to determine and/or identify the soft position associated with the particular direction, the control device 114 may calculate a particular distance (e.g., based on the full range of motion 120 of the implement 116) and determine and/or identify a position that is the particular distance away (e.g., in an opposite direction of the particular direction) from the stop position associated with the particular direction. Accordingly, the control device 114 may determine that the soft stop position is the position that is the particular distance away from the stop position associated with the particular direction (e.g., as described in relation to FIG. 1).

Additionally, or alternatively, after causing the command to be executed, the control device 114 may determine a velocity of the implement 116 moving in the particular direction at the power level. The determined velocity of the implement 116 may be an average velocity (e.g., a mean velocity, a median velocity, and/or the like), a maximum velocity, and/or the like. For example, the control device 114 may determine (e.g., based on position information obtained from the sensing devices 202) the starting position of the implement 116 and the stop position associated with the particular direction and may determine a travel distance of the implement 116 (e.g., by comparing the starting position of the implement 116 and the stop position associated with the particular direction). The control device 114 may divide the travel distance by an amount of time to travel from the starting position of the implement 116 to the stop position associated with the particular direction to determine the velocity (e.g., a mean velocity) of the implement 116 moving in the particular direction at the power level.

The control device 114 may store the power level, the particular direction, the determined velocity of the implement 116 moving in the particular direction, and/or the like as an entry in a calibration map. The calibration map includes information concerning respective relationships between representative velocities of the implement 116 and representative power levels. For example, the calibration map may include one or more entries, where each entry may indicate a representative power level; a direction of movement associated with the representative power level; a representative velocity of the implement 116, moving in the direction of movement, associated with the representative power level; and/or the like. In some implementations, the calibration map includes additional information, such as information identifying the one or more stop positions 118 associated with the implement 116, the one or more soft stop positions 122 associated with the implement 116, the full range of motion 120 of the implement 116, and/or the like. The calibration map is stored in a data structure (e.g., that is included in the control device 114 and/or that is accessible to the control device 114).

In a second scenario, such as a scenario to further calibrate the implement 116 after calibration of the implement 116 has been initiated (e.g., as described herein in relation to the first scenario), the operator may interact with the one or more implement control devices of the operator controls 112 to generate an additional command or the control device 114 may generate the additional command to move (e.g., to change a position of) the implement 116 in a similar manner as described herein (e.g., in relation to the first scenario).

The additional command may indicate a particular direction in which to move the implement 116, a power level, and/or the like. For example, the operator may interact with the one or more implement control devices to generate an additional command to move the implement 116 (e.g., up, down, right, left, and/or the like), at a power level that is less than the maximum power level (e.g., a 50%, a 75%, a 90% and/or the like power level).

In some implementations, the operator controls 112 may send (e.g., when the operator controls 112 generate the additional command) the command to the control device 114. The control device 114 may process (e.g., parse) the additional command to identify and/or determine the particular direction, the power level, and/or the like indicated by the additional command.

In some implementations, the control device 114 may determine an amount of time to move the implement 116 in the particular direction. For example, the control device 114 may access a time map (e.g., stored in the data structure that is included in the control device 114 and/or that is accessible to the control device 114) to determine the amount of time to move the implement 116 in the particular direction. The time map includes information concerning respective relationships between a particular direction in which to move the implement 116, a power level at which to move the implement 116, and/or an amount of time to move the implement 116 (e.g., which may be associated with an amount of time for implement 116 to reach a steady or maximum velocity). The control device 114 may search the time map, based on the particular direction in which to move the implement 116 and/or the power level at which to move the implement 116, to determine the amount of time to move the implement 116 in the particular direction.

Before causing the additional command to be executed, the control device 114 may determine an estimated velocity of the implement 116 moving in the particular direction (e.g., based on the determined amount of time and/or the particular direction, the power level, and/or the like indicated by the additional command). The control device 114 may access the calibration map (e.g., stored in the data structure that is included in the control device 114 and/or that is accessible to the control device 114) to determine the estimated velocity of the implement 116 moving in the particular direction.

For example, the control device 114 may search the calibration map to identify an entry that includes a representative power level that is greater than or equal to the power level indicated by the additional command (e.g., when the power level is a 60% power level, the control device 114 may search the calibration map for a representative power level that is greater than or equal to 60%) and/or a direction of movement associated with the representative power level that is the same as the particular direction indicated by the additional command (e.g., when the particular direction is upward the control device 114 may search the calibration map for an upward direction of movement associated with the representative power level). The entry may include a representative velocity of the implement 116 moving in the particular direction (e.g., that may be a velocity of the implement 116 moving in the particular direction that was previously determined by the control device 114, as described above in the first scenario). The control device 114 may identify and/or determine the representative velocity and may cause the estimated velocity to be based on the representative velocity. For example, the control device 114 may cause the estimated velocity to be a percentage of the representative velocity (e.g., 90%, 100%, 115%, and/or the like of the representative velocity).

Further, the control device 114 may determine a predicted travel distance of the implement 116 in the particular direction (e.g., based on the estimated velocity). For example, the control device 114 may determine the predicted travel distance of the implement 116 in the particular direction by multiplying the amount of time (e.g., indicated by the time map) by the estimated velocity.

In some implementations, the control device 114 may determine a current position (e.g., based on position information obtained from the sensing devices 202) of the implement 116 and may determine a maximum remaining travel distance of the implement 116 in the particular direction. The maximum remaining travel distance is a distance between the current position and an end position (e.g., the distance that the implement 116 can travel in the particular direction before hitting the end position). The end position may be the stop position in the particular direction. Additionally, or alternatively, the end position may be the soft stop position in the particular direction.

The control device 114 determines whether the predicted travel distance is less than or equal to the maximum remaining travel distance. When the control device 114 determines that the predicted travel distance is less than or equal to the maximum remaining travel distance, which may indicate that implement 116 may move in the particular direction (e.g., per the additional command) without hitting the end position in the particular direction, the control device 114 causes the additional command to be executed to cause the implement 116 to move in the particular direction and for the amount of time. In this way, the control device 114 may cause the implement 116 to move from the current position to another position without hitting the end position (e.g., the stop position associated with the particular direction or the soft stop position associated with the particular direction).

When the control device 114 determines that the predicted travel distance is greater than the maximum remaining travel distance, which may indicate that implement 116 may hit the end position when moving in the particular direction (e.g., per the additional command), the control device 114 determines and/or identifies a reset position and causes the implement 116 to move from the current position to the reset position. The reset position is in an opposite direction of the particular direction from the current position. The reset position may be: a position that is greater than or equal to the predicted travel distance away from the end position (e.g., in the opposite direction); a soft stop position associated with the opposite direction (e.g., a maximum allowed position of the implement 116 in the opposite direction); a stop position associated with the opposite direction (e.g., a position associated with a full extension of the implement 116 in the opposite direction); and/or the like. In this way, the control device 114 may cause the reset position to be a distance away from the end position that is greater than or equal to the predicted travel distance of the implement 116 (e.g., to ensure that that implement 116 may move in the particular direction without hitting the end position when causing the command to be executed).

To cause the implement 116 to move from the current position to the reset position (e.g., in the opposite direction), the control device 114 generates a reset command. The reset command may indicate a default power level (e.g., a constant power level for resetting implement 116) (e.g., a 15% power level, a 50% power level, a 60% power level, and/or the like) for the implement 116 to move in the opposite direction of the particular direction, a reset travel distance (e.g., a distance to travel to the reset position), and/or the like. The reset travel distance may be a difference between the predicted travel distance and the maximum remaining travel distance; a difference between the current position and a soft stop position associated with the opposite direction; a difference between the current position and a stop position associated with the opposite direction; and/or the like The control device 114 may cause the reset command to be executed to cause the implement 116 to move, in the opposite direction of the particular direction (e.g., at the particular power level), from the current position to the reset position.

After causing the implement 116 to move to the reset position, the control device 114 causes the additional command to be executed to cause the implement 116 to move in the particular direction at the power level and for the amount of time (e.g., indicated by the time map) (e.g., in a similar manner as described herein). In this way, the control device 114 causes the implement 116 to move from the reset position to another position without hitting the end position (e.g., the stop position associated with the particular direction or the soft stop position associated with the particular direction).

In some implementations, after causing the additional command to be executed, the control device 114 determines a velocity of the implement 116 when the implement 116 is moving in the particular direction (e.g., from the current position to a first other position or from the reset position to a second other position). The determined velocity of the implement 116 may be an average velocity (e.g., a mean velocity, a median velocity, and/or the like), a maximum velocity, and/or the like. For example, the control device 114 may determine a travel distance of the implement 116 (e.g., by comparing the current position and the first other position or by comparing the reset position and the second other position) and divide the travel distance by the amount of time (e.g., indicated by the time map) to determine the velocity (e.g., mean velocity) of the implement 116 moving in the particular direction for the amount of time.

The control device 114 causes the calibration map to be updated based on the additional command and the determined velocity of the implement 116. For example, the control device 114 may store the power level, the particular direction, the determined velocity of the implement 116 moving in the particular direction, and/or the like as an entry in the calibration map (e.g., in a similar manner as described herein in relation the first scenario).

As indicated above, FIG. 2 is provided as an example. Other examples are possible and may differ from what was described in connection with FIG. 2.

Figure 3:
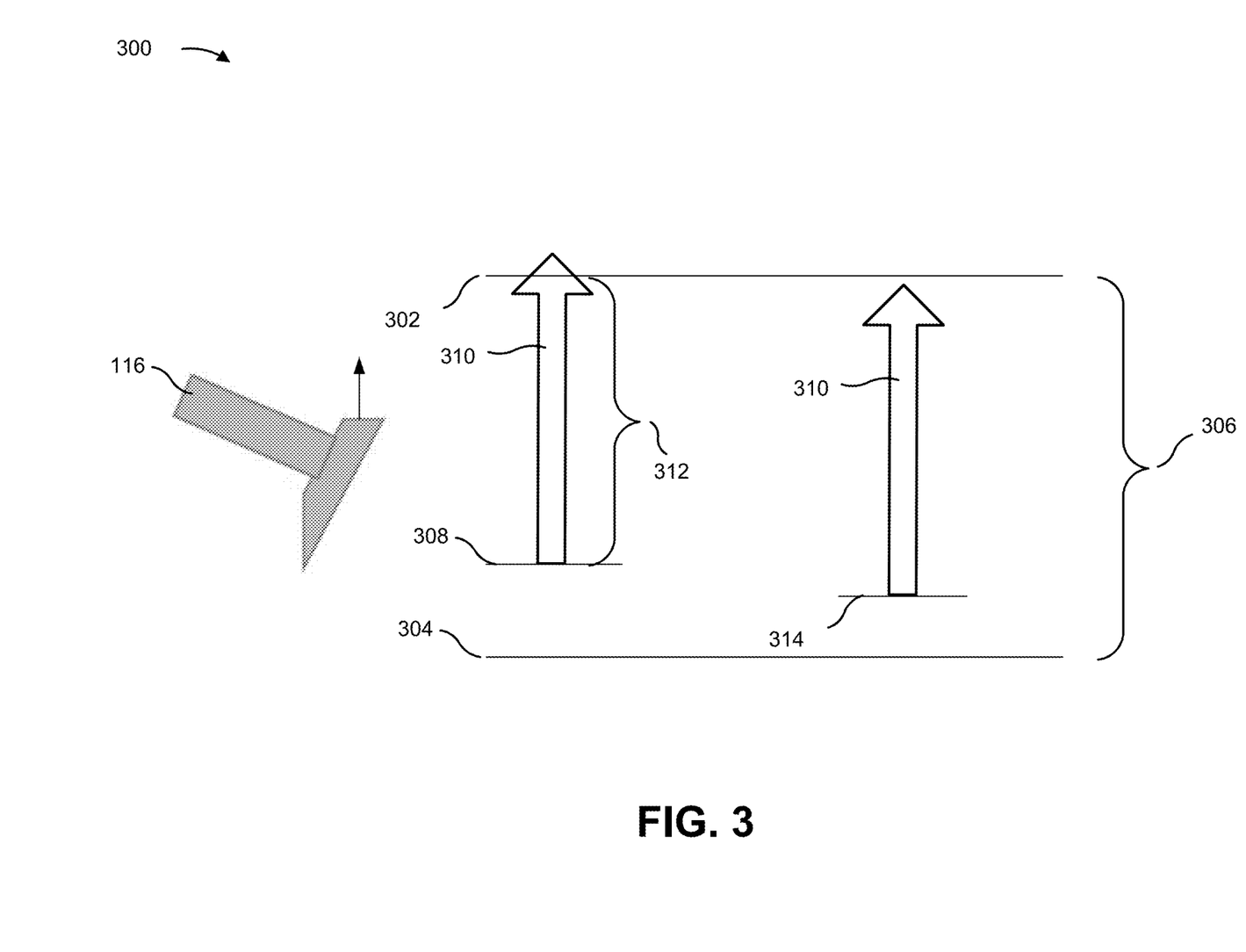
FIGS. 3-4 are diagrams of example operations of an implement by a control device described herein.

FIG. 3 is a diagram illustrating an example operation of the implement 116 by the control device 114 (e.g., to calibrate the implement 116 and/or to test a calibration of the implement 116 without hitting a stop position). As shown in FIG. 3, the implement 116 is associated with a stop position 302 in the upward direction and a stop position 304 in the downward direction. A full range of motion 306 is defined by the stop position 302 and the stop position 304. The implement 116 is at a current position 308.

The control device 114 obtains a command to move the implement 116 in the upward direction. The control device 114 determines a predicted travel distance 310 of the implement 116 in the upward direction (e.g., based on an estimated velocity of the implement 116 moving in the upward direction indicated by a calibration map and/or an amount of time for the implement 116 to move in the upward direction). The control device 114 determines that a maximum remaining travel distance 312 (e.g., a distance between the current position 308 and the stop position 302) is less than the predicted travel distance 310 and causes the implement 116 to move to a reset position 314 (e.g., a position that is a distance away, in the downward direction, from the stop position 302 that is greater than or equal to the predicted travel distance 310). After causing the implement 116 to move to the reset position 314, the control device 114 causes the command to be executed to cause the implement 116 to move in the upward direction and for the amount of time (e.g., in a similar manner as described herein in relation to FIG. 2). In this way, the control device 114 causes the implement 116 to move from the reset position 314 to another position in the upward direction without hitting the stop position 302.

As indicated above, FIG. 3 is provided as an example. Other examples are possible and may differ from what was described in connection with FIG. 3.

Figure 4:
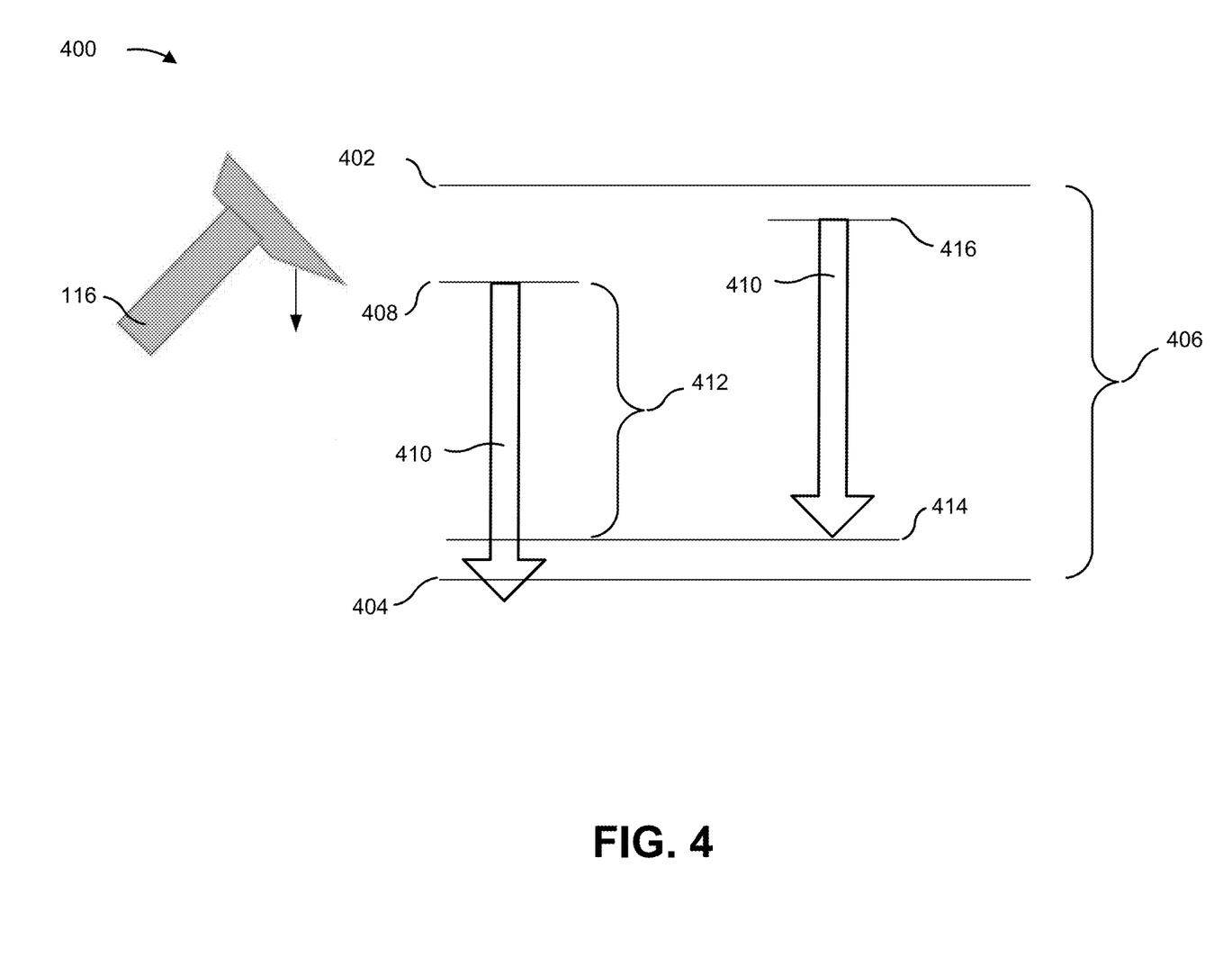

FIG. 4 is a diagram illustrating an example operation of the implement 116 by the control device 114 (e.g., to calibrate the implement 116 and/or to test a calibration of the implement 116 without hitting a soft stop position). As shown in FIG. 4, the implement 116 is associated with a stop position 402 in the upward direction and a stop position 404 in the downward direction. A full range of motion 406 is defined by the stop position 402 and the stop position 404. The implement 116 is at a current position 408.

The control device 114 obtains a command to move the implement 116 in the downward direction. The control device 114 determines a predicted travel distance 410 of the implement 116 in the downward direction (e.g., based on an estimated velocity of the implement 116 moving in the downward direction indicated by a calibration map and/or an amount of time for the implement 116 to move in the downward direction). The control device 114 determines that a maximum remaining travel distance 412 (e.g., a distance between the current position 408 and a soft stop position 414 in the downward direction) is less than the predicted travel distance 410 and causes the implement 116 to move to a reset position 416 (e.g., a position that is a distance away, in the upward direction, from the soft stop position 414 that is greater than or equal to the predicted travel distance 410). After causing the implement 116 to move to the reset position 416, the control device 114 causes the command to be executed to cause the implement 116 to move in the downward direction and for the amount of time indicated by the command (e.g., in a similar manner as described herein in relation to FIG. 2). In this way, the control device 114 causes the implement 116 to move from the reset position 416 to another position in the downward direction without hitting the soft stop position 414.

As indicated above, FIG. 4 is provided as an example. Other examples are possible and may differ from what was described in connection with FIG. 4.

Figure 5:
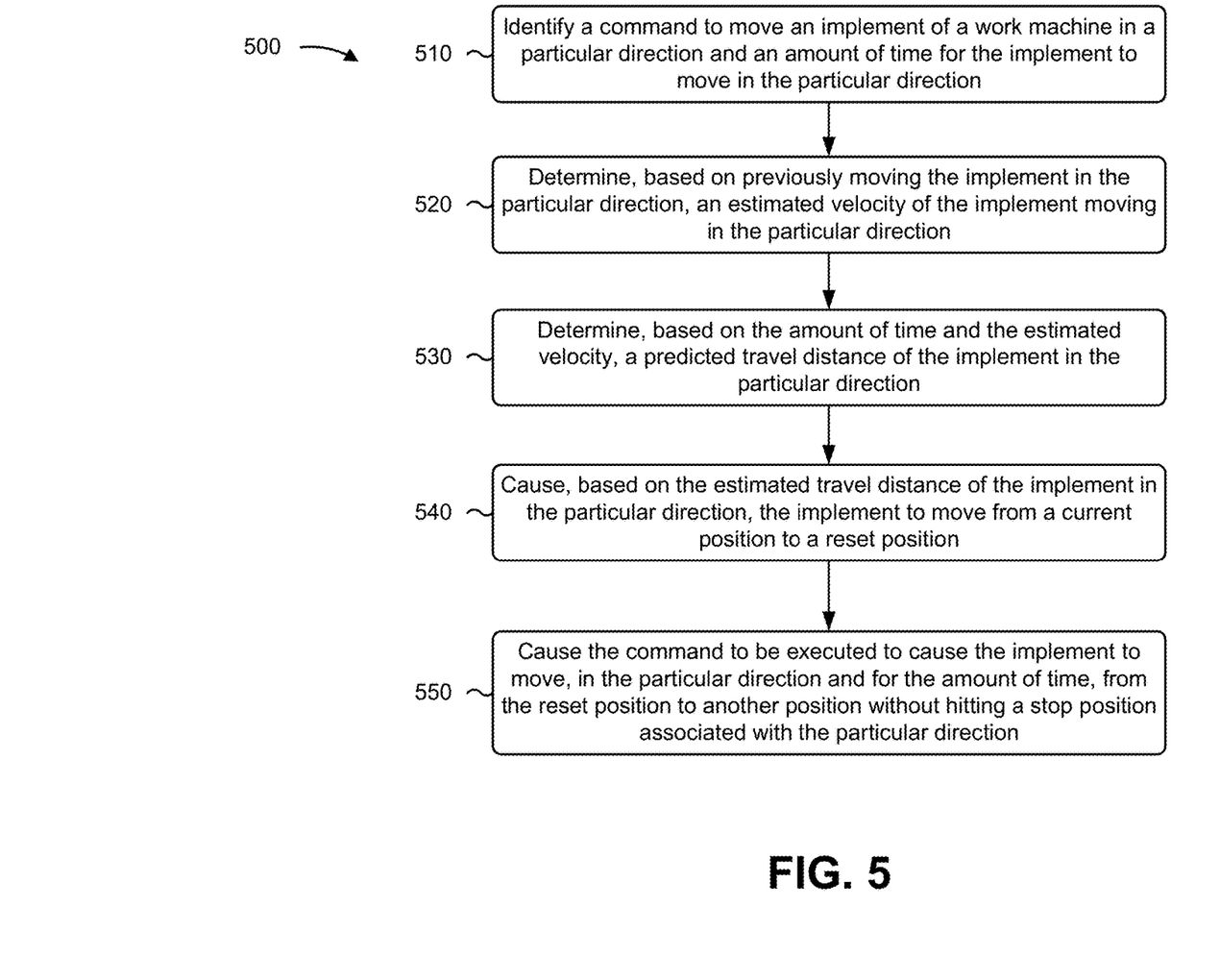
FIG. 5 is a flowchart of an example process to predict implement travel for a work machine.

FIG. 5 is a flowchart of an example process 500 for implement travel prediction for a work machine. One or more process blocks of FIG. 5 may be performed by a control device (e.g., control device 114). In some implementations, one or more process blocks of FIG. 5 may be performed by another device or a group of devices separate from or including the controller, such as operator controls (e.g., operator controls 112), sensing devices (e.g., sensing devices 202), and/or the like.

As shown in FIG. 5, process 500 may include identifying a command to move an implement of a work machine in a particular direction and an amount of time for the implement to move in the particular direction (block 510). For example, the control device may identify a command to move an implement of a work machine in a particular direction and an amount of time for the implement to move in the particular direction, as described above.

As further shown in FIG. 5, process 500 may include determining, based on previously moving the implement in the particular direction, an estimated velocity of the implement moving in the particular direction (block 520). For example, the control device may determine, based on previously moving the implement in the particular direction, an estimated velocity of the implement moving in the particular direction, as described above.

As further shown in FIG. 5, process 500 may include determining, based on the amount of time and the estimated velocity, a predicted travel distance of the implement in the particular direction (block 530). For example, the control device may determine, based on the amount of time and the estimated velocity, a predicted travel distance of the implement in the particular direction, as described above.

As further shown in FIG. 5, process 500 may include causing, based on the predicted travel distance of the implement in the particular direction, the implement to move from a current position to a reset position (block 540). For example, the control device may cause, based on the predicted travel distance of the implement in the particular direction, the implement to move from a current position to a reset position, as described above.

As further shown in FIG. 5, process 500 may include causing the command to be executed to cause the implement to move, in the particular direction and for the amount of time, from the reset position to another position without hitting a stop position associated with the particular direction (block 550). For example, the control device may cause the command to be executed to cause the implement to move, in the particular direction and for the amount of time, from the reset position to another position without hitting a stop position associated with the particular direction, as described above.

Process 500 may include additional implementations, such as any single implementation or any combination of implementations described below and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The disclosed control device (e.g., the control device 114) may be used with any implement of any work machine where preventing the implement from hitting an end position when moving in a particular direction is needed. The control device is able to identify a command to move an implement of a work machine in a particular direction and determine a predicted travel distance of the implement in the particular direction based on the command. If the predicted travel distance is greater than or equal to a maximum remaining travel distance available to the implement before hitting an end position (e.g., a stop position or a soft stop position) associated with the particular direction, the control device causes the implement to move to a reset position that is a particular distance away from the end position that is greater than the predicted travel distance. The control device then may cause the command to be executed to cause the implement to move in the particular direction without hitting the end position.

In this way, by moving the implement to a reset position before causing the command to be executed, the control device prevents the implement from hitting the end position associated with the particular direction when the command is executed. This prevents potential damage to the implement from hitting a stop position and/or prevents vibrations that affect a performance of the implement and/or the work machine from being created by the implement hitting the stop position.

Further, the control device may be used to facilitate calibration of the implement. In one calibration process, an implement may be alternately moved between two opposite directions at different power levels to generation a calibration map associated with the implement. For example, the calibration process may require the implement move in a first direction at a 100% power level (e.g., until the implement hits a stop position as described herein), then move in a second direction at a 100% power level (e.g., until the implement hits a stop position as described herein), then move in the first direction at a 90% power level for a first period of time (e.g., as described herein), then move in the second direction at a 90% power level for a second period of time (e.g., as described herein), and/or the like. The control device 114 may automate this calibration process and may automatically adjust the implement to a reset position when a predicted travel distance is greater than or equal to a maximum remaining travel distance available to the implement before hitting an end position. This may ensure that the implement is able to fully move in the first direction or the second direction according to the calibration process, which may produce more accurate velocity determinations regarding the implement moving in either direction and at different power levels for the period of time. The more accurate velocity determinations may be stored in the calibration map, which may be used to improve a performance of the implement (e.g., after the calibration process is completed).

What is claimed is:

1. A method performed by a processor, comprising:
   identifying a command to move an implement of a work machine in a particular direction and an amount of time for the implement to move in the particular direction;
   determining, based on a previously determined velocity of the implement moving in the particular direction, an estimated velocity of the implement moving in the particular direction;
   determining, based on the amount of time and the estimated velocity, a predicted travel distance of the implement in the particular direction;
   causing, based on a stop position associated with the particular direction and the predicted travel distance of the implement in the particular direction, the implement to move from a current position to a reset position; and
   causing the command to be executed to cause the implement to move, in the particular direction and for the amount of time, from the reset position to another position without hitting the stop position associated with the particular direction.

2. The method of claim 1, further comprising:
   determining, based on causing the command to be executed, a maximum velocity of the implement when moving in the particular direction from the reset position to the other position; and
   causing, based on the command and the determined maximum velocity of the implement, a calibration map associated with the implement to be updated.

3. The method of claim 1, further comprising:
   determining a power level associated with the command;
   determining, based on causing the command to be executed, a maximum velocity of the implement when moving in the particular direction from the reset position to the other position; and causing a calibration map associated with the implement to be updated to indicate an association between the power level and the determined maximum velocity of the implement.

4. The method of claim 1, wherein determining the estimated velocity of the implement moving in the particular direction comprises:
determining a power level of the command;
determining a power level of a previous command associated with the previously determined velocity of the implement moving in the particular direction;
determining that the power level of the previous command is greater than or equal to the power level of the command; and
causing the estimated velocity of the implement moving in the particular direction to be the previously determined velocity of the implement moving in the particular direction.

5. The method of claim 1, wherein the reset position is in an opposite direction of the particular direction from the current position.

6. The method of claim 1, wherein causing the implement to move from the current position to the reset position comprises:
determining, based on the stop position associated with the particular direction, a soft stop position associated with the particular direction,
wherein the soft stop position associated with the particular direction is a first distance away from the stop position associated with the particular direction in an opposite direction of the particular direction,
wherein the first distance is based on a full range of motion of the implement; and
determining, based on the soft stop position associated with the particular direction and the predicted travel distance of the implement in the particular direction, the reset position,
wherein the reset position is a second distance away from the soft stop position associated with the particular direction in the opposite direction of the particular direction,
wherein the second distance is based on the predicted travel distance of the implement in the particular direction.

7. The method of claim 1, wherein causing the implement to move from the current position to the reset position comprises:
generating an additional command that indicates a particular power level for the implement to move in the opposite direction of the particular direction; and
causing the additional command to be executed to cause the implement to move, in the opposite direction of the particular direction, from the current position to the reset position.

8. A controller, comprising:
one or more memories; and
one or more processors, communicatively coupled to the one or more memories, configured to:
identify a command to move an implement of a work machine in a particular direction and an amount of time to move the implement in the particular direction;
determine, based on previously moving the implement in the particular direction, an estimated velocity of the implement moving in the particular direction;
determine, based on the amount of time and the estimated velocity, a predicted travel distance of the implement in the particular direction;
cause, based on the predicted travel distance of the implement in the particular direction, the implement to move from a current position to a reset position; and
cause the command to be executed to cause the implement to move, in the particular direction and for the amount of time, from the reset position to another position without hitting a stop position associated with the particular direction.

9. The controller of claim 8, wherein the command is provided by operator controls of the work machine.

10. The controller of claim 8, wherein the one or more processors, when determining the estimated velocity of the implement moving in the particular direction, are configured to:
determine a power level associated with the command;
identify, based on a calibration map associated with the implement, a different power level that is greater than the power level associated with the command;
determine, based on the calibration map, a maximum velocity of the implement associated with the different power level; and
determine, based on the maximum velocity of the implement associated with the different power level, the estimated velocity of the implement moving in the particular direction.

11. The controller of claim 8, wherein the one or more processors, when causing the implement to move from the current position to the reset position, are configured to:
determine a distance between the current position and the stop position associated with the particular direction;
determine that the distance is less than the predicted travel distance; and
cause, based on determining that the distance is less than the predicted travel distance, the implement to move from the current position to the reset position.

12. The controller of claim 8, wherein a distance between the reset position and the stop position associated with the particular direction is greater than the predicted travel distance of the implement in the particular direction.

13. The controller of claim 8, wherein the one or more processors are further configured to:
determine, based on causing the command to be executed, a maximum velocity of the implement when the implement is moving in the particular direction from the reset position to the other position; and
cause a calibration map associated with the implement to be updated to indicate an association between a power level of the command and the determined maximum velocity of the implement.

14. The controller of claim 8, wherein the one or more processors are further configured to:
determine a power level associated with the command;
determine, based on causing the command to be executed, a maximum velocity of the implement when the implement is moving in the particular direction from the reset position to the other position; and
cause, based on the power level and the determined maximum velocity of the implement, a calibration map associated with the implement to be updated.

15. An implement calibration system, comprising:
an implement associated with a work machine and configured to move in a first direction and a second direction, wherein the first direction is opposite of the second direction;
an implement control device configured to control the implement; and
a controller configured to:
obtain, from the implement control device, a command to move the implement in the first direction;
determine, based on a power level of the command and a calibration map associated with the implement, an estimated velocity of the implement moving in the first direction;
determine, based on an amount of time to move the implement in the first direction and the estimated velocity, a predicted travel distance of the implement in the first direction;
cause, based on the predicted travel distance of the implement in the first direction, the implement to move in the second direction from a current position to a reset position;
cause the command to be executed to cause the implement to move, in the first direction and for the amount of time, from the reset position to another position without hitting a stop position associated with the first direction;
determine, based on causing the command to be executed, a maximum velocity of the implement when moving in the first direction from the reset position to the other position; and
cause the calibration map associated with the implement to be updated to indicate an association between the power level of the command and the determined maximum velocity of the implement.

16. The implement calibration system of claim 15, wherein the implement is a blade, a ripper, an auger, a bucket, a breaker, a hammer, a brush, a compactor, a cutter, a forked lifting device, or a grader bit.

17. The implement calibration system of claim 15, wherein the stop position associated with the first direction indicates a position associated with a full extension of the implement in the first direction.

18. The implement calibration system of claim 15, wherein the calibration map associated with the implement includes one or more entries, wherein each entry indicates:
a representative power level;
a direction of movement associated with the representative power level; and
a representative velocity of the implement moving in the direction of movement.

19. The implement calibration system of claim 15, wherein the controller, when determining the estimated velocity of the implement moving in the first direction, is configured to:
select an entry included in the calibration map associated with the implement that is associated with the first direction and that identifies a representative power level that is greater than or equal to the power level of the command;
identify, in the selected entry, a representative velocity of the implement moving in the first direction that is associated with the representative power level; and
determine, based on the representative velocity of the implement moving in the first direction, the estimated velocity of the implement moving in the first direction.

20. The implement calibration system of claim 15, wherein the controller, when causing the implement to move in the second direction from the current position to the reset position, is configured to:
identify a default power level associated with moving the implement in the second direction; and
causing, based on the default power level, the implement to move in the second direction from the current position to the reset position.

* * * * *